United States Patent
Nishio et al.

(10) Patent No.: US 10,955,618 B2
(45) Date of Patent: Mar. 23, 2021

(54) FIBER COUPLING DEVICE

(71) Applicant: Panasonic Intellectual Property Management Co., Ltd., Osaka (JP)

(72) Inventors: Masatoshi Nishio, Osaka (JP); Hitoshi Nishimura, Osaka (JP); Jingbo Wang, Hyogo (JP); Makoto Ryudo, Hyogo (JP); Doukei Nagayasu, Hyogo (JP); Hideaki Yamaguchi, Osaka (JP); Yoshiaki Takenaka, Osaka (JP); Kiyotaka Eizumi, Osaka (JP); Ryo Ishikawa, Osaka (JP); Yasushi Mukai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 43 days.

(21) Appl. No.: 16/426,699

(22) Filed: May 30, 2019

(65) Prior Publication Data

US 2019/0278026 A1    Sep. 12, 2019

Related U.S. Application Data

(63) Continuation of application No. PCT/JP2017/033804, filed on Sep. 20, 2017.

(30) Foreign Application Priority Data

Dec. 12, 2016  (JP) .............................. JP2016-240056

(51) Int. Cl.
*G02B 6/26* (2006.01)
*G02B 6/32* (2006.01)
(Continued)

(52) U.S. Cl.
CPC ............... *G02B 6/32* (2013.01); *G02B 6/262* (2013.01); *G02B 6/4206* (2013.01); *G02B 6/4296* (2013.01); *G02B 19/0028* (2013.01)

(58) Field of Classification Search
CPC ........ G02B 6/32; G02B 6/262; G02B 6/4206; G02B 6/4296; G02B 19/0028;
(Continued)

(56) References Cited

U.S. PATENT DOCUMENTS 5,245,682 A      9/1993   Ortiz, Jr.
2010/0259758 A1* 10/2010  Asano ................. H01S 5/06255
                                              356/479
(Continued)

FOREIGN PATENT DOCUMENTS

CN    103097931    5/2013
JP    5-157930     6/1993
(Continued)

OTHER PUBLICATIONS

International Search Report of PCT application No. PCT/JP2017/033804 dated Dec. 19, 2017.
(Continued)

*Primary Examiner* — Kaveh C Kianni
*Assistant Examiner* — Hung Q Lam
(74) *Attorney, Agent, or Firm* — Wenderoth, Lind & Ponack, L.L.P.

(57) ABSTRACT

A fiber coupling device (100) includes the following components: a wedge plate (102) for receiving light and refracting the light in a predetermined direction, a condenser lens (104) for collecting the light refracted by the wedge plate (102); and an optical fiber (107) having an incident surface for receiving the light collected by the condenser lens (104). The wedge plate (102) is held rotatable around the optical axis (200) of the light incident on the wedge plate (102). The
(Continued)

light refracted by the wedge plate (102) and collected by the condenser lens (104) is incident on a different point on the incident surface depending on the rotation angle of the wedge plate (102).

11 Claims, 6 Drawing Sheets

(51) Int. Cl.
*G02B 6/42* (2006.01)
*G02B 19/00* (2006.01)

(58) Field of Classification Search
CPC .............. G02B 6/3624; G02B 27/0927; G02B 26/0891; G02B 27/0994; G02B 27/0955; G02B 6/03622; G02B 6/03633
USPC .............................. 385/31, 33–38, 61, 74, 79
See application file for complete search history.

(56) References Cited

U.S. PATENT DOCUMENTS

| | | | |
|---|---|---|---|
| 2013/0223792 | A1 | 8/2013 | Huber et al. |
| 2015/0293306 | A1 | 10/2015 | Huber et al. |

FOREIGN PATENT DOCUMENTS

| | | |
|---|---|---|
| JP | 9-292544 | 11/1997 |
| JP | 2002-023072 | 1/2002 |
| JP | 2007-173649 | 7/2007 |

OTHER PUBLICATIONS

English Translation of Chinese Search Report dated Mar. 4, 2020 for the related Chinese Patent Application No. 201780075099.3.

\* cited by examiner

FIBER COUPLING DEVICE

This application is a U.S. national stage application of the PCT International Application No. PCT/JP2017/033804 filed on Sep. 20, 2017, which claims the benefit of foreign priority of Japanese patent application No. 2016-240056 filed on Dec. 12, 2016, the contents all of which are incorporated herein by reference.

TECHNICAL FIELD

The present invention relates to a fiber coupling device for enabling laser light to be collected and received by an optical fiber.

BACKGROUND ART

There has been a known technique for performing various kinds of processing using the same power source by propagating high-power laser light to an optical fiber and by changing properties of the light emitted from the optical fiber (e.g., Patent Literature 1).

Patent literature 1 shows a technique for changing the propagation conditions of laser light in an optical fiber by using a plurality of condenser lenses with different focal lengths. To be more specific, the condenser lens placed in the optical path of the laser light is made replaceable. This makes the focal length of the condenser lens in the optical path variable, thereby making the numerical aperture (NA) of the light incident on the optical fiber variable. Thus, switching between the different condenser lenses can change the beam quality of the laser light emitted from the optical fiber.

CITATION LIST

Patent Literature

PTL 1: U.S. Pat. No. 5,245,682

SUMMARY

Technical Problems

Such conventional fiber coupling devices can change properties of the emitted light discretely but not continuously.

This is because when the condenser lens in the laser light path is replaced, the output of the laser light should be stopped until the replacement is completed. If the condenser lens were replaced without stopping the output of the laser light, the light scattered outside the effective diameter of the condenser lens might generate heat, or the laser light might fail to be collected at a desired point.

In view of the above problems, an object of the present invention is to provide a fiber coupling device capable of continuously changing properties of light emitted from the optical fiber.

Solutions to Problems

The fiber coupling device of the present invention includes a wedge plate for receiving light and refracting the light in a predetermined direction; a condenser lens for collecting the light refracted by the wedge plate; and an optical fiber having an incident surface for receiving the light collected by the condenser lens. The wedge plate is held rotatable around the optical axis of the light incident on the wedge plate. The light refracted by the wedge plate and collected by the condenser lens is incident on a different point on the incident surface depending on the rotation angle of the wedge plate.

Advantageous Effects of Invention

According to the present invention, a simple rotation of the wedge plate can change properties of light emitted from the optical fiber, without the need to stop the output of the laser light when the condenser lens is replaced.

DESCRIPTION OF EMBODIMENT

Figure 1:
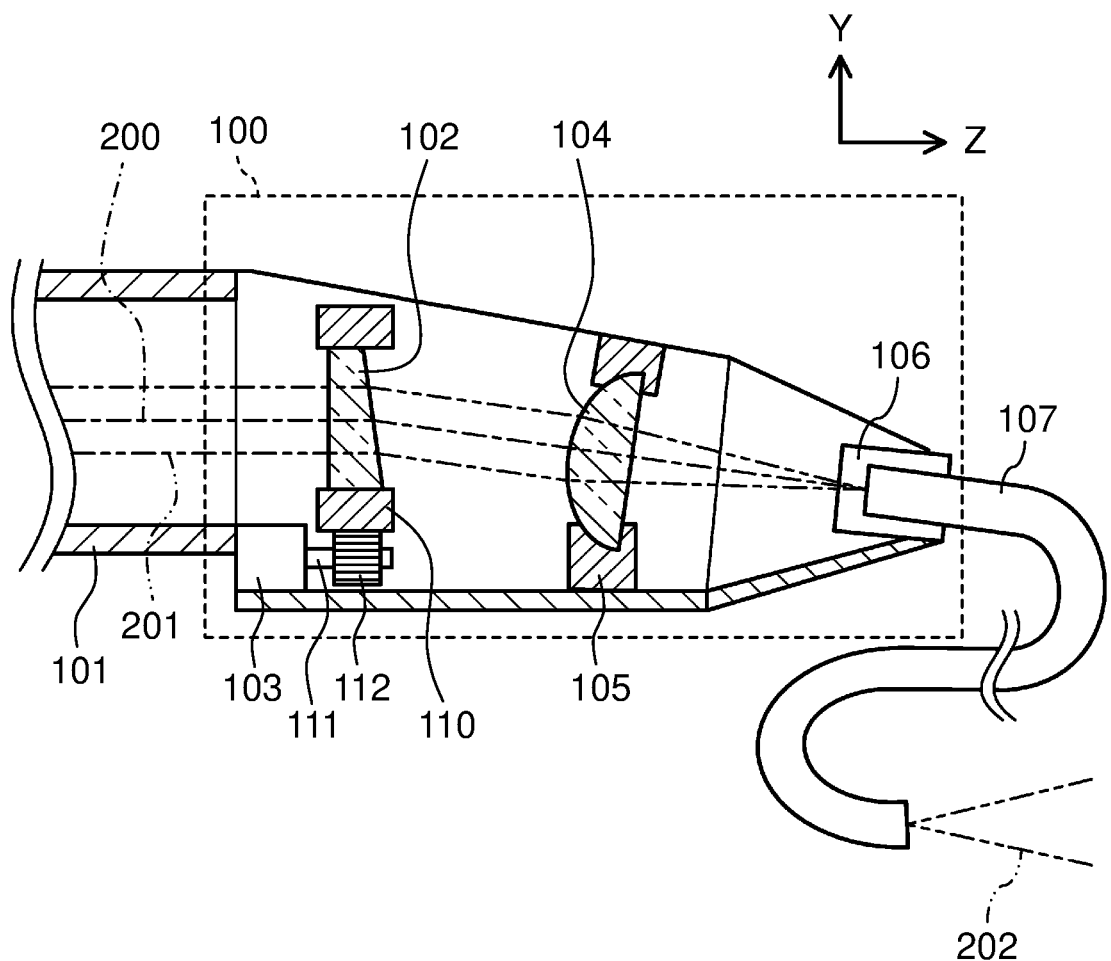
FIG. 1 is a partially cutaway side view of a fiber coupling device according to a present exemplary embodiment.

The exemplary embodiment of the present invention will be described as follows with reference to drawings. In these drawings, the same reference numerals are used for the same components and the description thereof may be omitted.

The coordinate axes (X, Y, and Z axes) shown in the drawings are orthogonal to each other. The Y axis corresponds to the vertical direction of the plane of the drawings.

Main Components of the Fiber Coupling Device

As shown in FIG. 1, laser output device 101 emits, as collimated light, high-power laser light with a predetermined beam size. The collimated light enters fiber coupling device 100.

In the present exemplary embodiment, laser output device 101 outputs multimode near-infrared laser light with a wavelength of 1 μm and an output of 4 kW. The beam size is 3 mm. The chain line shown in FIG. 1 represents optical axis 200 of the laser light emitted from device 101, whereas the two-dot chain lines represent optical path 201 of the laser light.

Fiber coupling device 100 includes the following components: wedge plate 102 for receiving light and refracting the light in a predetermined direction; rotary drive unit 103 for rotating wedge plate 102 around optical axis 200 of the light incident on wedge plate 102; condenser lens 104 for collecting the light refracted by wedge plate 102; and optical fiber 107 having an incident surface for receiving the light collected by condenser lens 104.

Wedge plate 102, which is a circular disk-shaped optical member, has an emission surface inclined with respect to the incident surface. Hence, wedge plate 102 can refract incident light in a predetermined direction. Wedge plate 102 is held in cylindrical member 110, which is surrounded by an unillustrated gear.

Rotary drive unit 103, which is formed of a small motor, has drive shaft 111 with gear 112 in mesh with the gear of cylindrical member 110. Rotary drive unit 103 rotates gear 112 to transmit a rotational driving force to cylindrical member 110. This allows wedge plate 102 to rotate around optical axis 200 of the light incident on wedge plate 102. The rotation angle of wedge plate 102 can be adjusted by adjusting the rotation angle of gear 112.

Gear 112 can be replaced by an unillustrated belt for transmitting the rotational driving force of rotary drive unit 103 to cylindrical member 110.

Condenser lens 104 can have a focal length of 20 to 50 mm. Lens 104 is optically designed so that the multimode laser light used can have a spot diameter of about 80 μm and that the NA is less than 0.2 when the laser light is collected.

Condenser lens 104 is held in adjustment holding unit 105 so as to be fixed in position without distortion. Unit 105 fixes condenser lens 104, which is a high-precision part, so as to prevent the incident surface of optical fiber 107 from being damaged by the displacement of the point of light collection.

Figure 3:
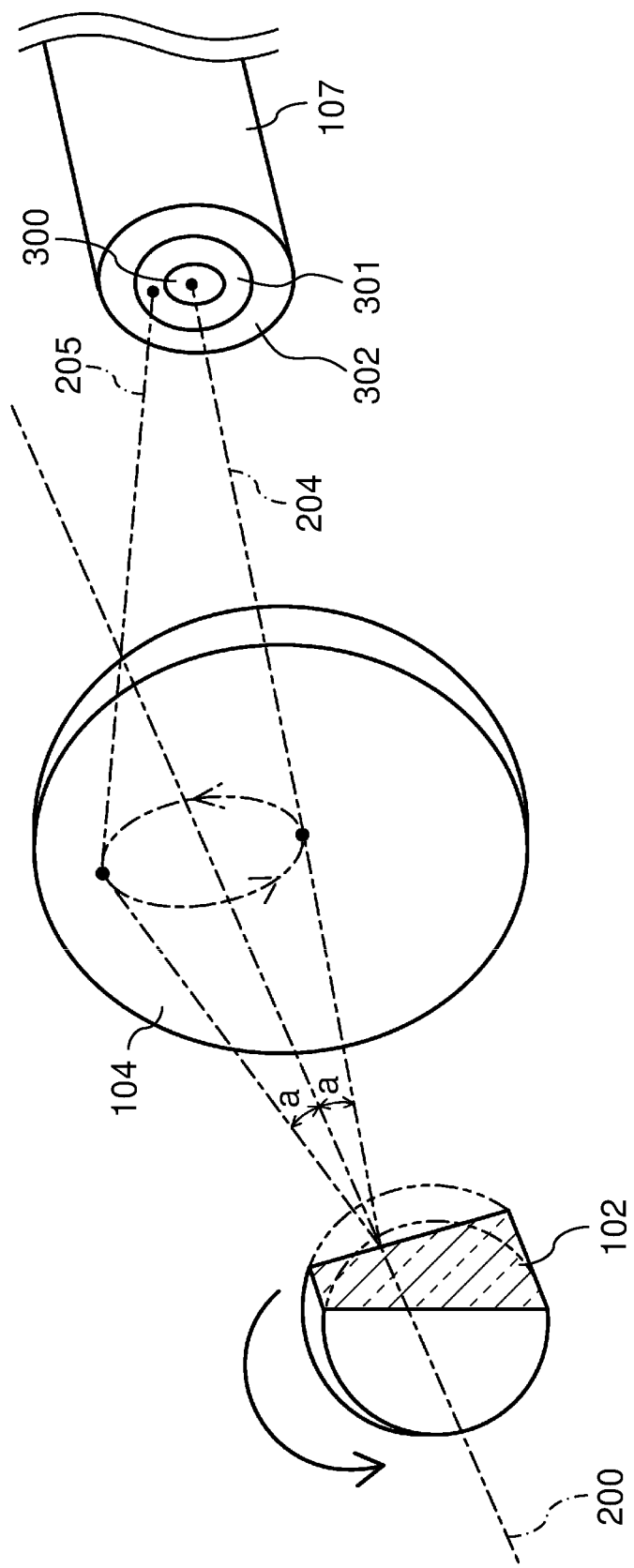
FIG. 3 is a partially cutaway perspective view showing changes in the optical paths due to changes in the rotation angle of the wedge plate.

Optical fiber 107 concentrically has two waveguides for transmitting two beams of light, respectively. To be more specific, optical fiber 107 is a double-clad fiber having the following: core 300 including the center of the incident surface; first clad 301 outside core 300, and second clad 302 outside first clad 301 (FIG. 3).

When core 300, first clad 301 and second clad 302 of optical fiber 107 have refractive indexes of nc, n1, and n2, respectively, these indexes are in the relation of nc>n1>n2. In the present exemplary embodiment, core 300 has a diameter of 100 μm and an NA of 0.2, whereas first clad 301 has an outer diameter of 400 μm and an NA of 0.4.

Optical fiber 107 is held in position by receptacle 106 so as to prevent displacement of the incident point. Unlike the illustrated configuration, if optical fiber 107 has an inlet facing down in the vertical direction (the negative direction along the Y axis), dust deposition may be prevented.

The light, which has propagated through optical fiber 107 by fiber coupling device 100, is emitted as light 202.

Figure 2:
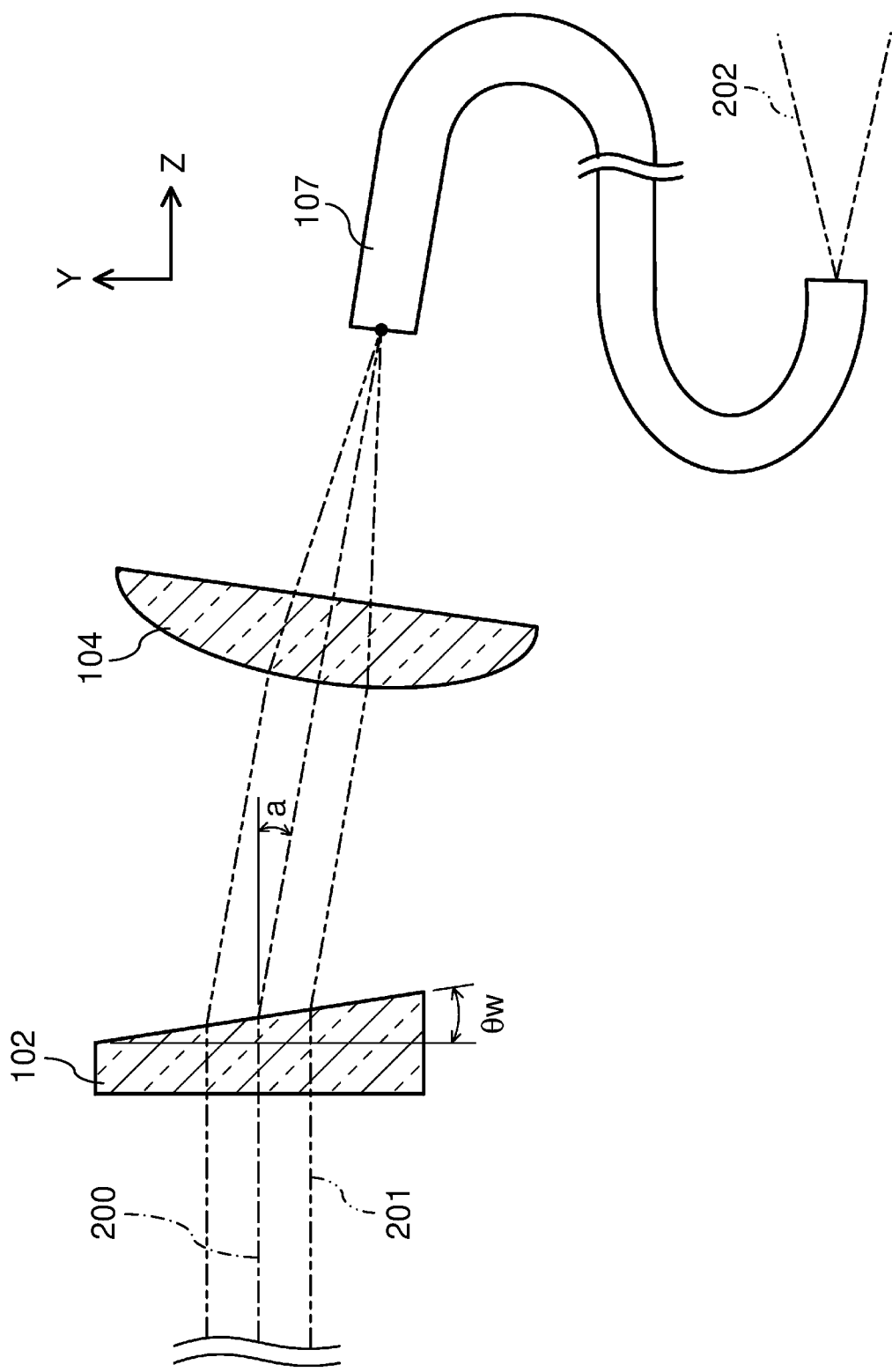
FIG. 2 is a partially cutaway side view showing the placement of a wedge plate, a condenser lens, and an optical fiber.

As shown in FIG. 2, when wedge plate 102 is at a predetermined first rotation angle, the light refracted by wedge plate 102 passes through the center of condenser lens 104 and the center of the incident surface of optical fiber 107.

To be more specific, the light entered fiber coupling device 100 in the direction parallel to the Z axis is given a declination "a" by wedge plate 102. Wedge plate 102 can be, for example, a plate coated with an anti-reflection (AR) film and with low loss. One example is a plate made of fused silica and having a refractive index nw of 1.45.

Assuming that the wedge angle is θw, the declination "a" of wedge plate 102 can be expressed by the following formula (1) when sin (θw)<<1.

$$a \approx (nw-1) \cdot \theta w \quad (1)$$

where when the wedge angle θw is set to 2 degrees, the declination "a" of the emitted light can be set to 1 degree.

As shown in FIG. 2, the center of condenser lens 104 and the center of the incident surface of optical fiber 107 are concentrically arranged. In addition, optical axis 200 is aligned with the center of condenser lens 104 and with the central axis of optical fiber 107. In this case, wedge plate 102 is referred to as being at a reference rotation position. In short, the first rotation angle is referred to as the reference rotation position. The light collected by condenser lens 104 is incident on core 300 of optical fiber 107 when wedge plate 102 is at the reference rotation position. The light incident on core 300 has a spot diameter smaller than the diameter of core 300.

The following is a description of effects obtained when laser light passes through fiber coupling device 100. As shown in FIGS. 1 and 2, when wedge plate 102 is at the reference rotation position, the laser light emitted from device 101 is refracted as collimated light by wedge plate 102, passes through the center of condenser lens 104, and is collected and received by core 300 of optical fiber 107.

High-power laser light, when passing through wedge plate 102, has a thermal lens effect on plate 102. However, in fiber coupling device 100 of the present exemplary embodiment, wedge plate 102 is not replaced. Therefore, if the output of the laser light is kept constant, the lens properties of wedge plate 102 caused by the thermal lens effect remain unchanged, or in other words, wedge plate 102 has a constant focal length.

Thus, the optical design can be made in consideration of the thermal lens effect at any output, preventing deterioration of the coupling efficiency of the laser light to optical fiber 107.

The laser light always passes through the center of wedge plate 102, thereby reducing light scattering and absorption losses outside the effective diameter.

The wedge angle θw of wedge plate 102 and the declination "a" with respect to the optical axis given by wedge plate 102 are in the above-mentioned relation of Formula (1). Hence, similar effects can be obtained by selecting an appropriate wedge plate according to the wavelength, output and beam quality of the light to be used.

Operation of the Fiber Coupling Device

The operation of fiber coupling device 100 will be described as follows. As shown in FIG. 3, adjusting the rotation angle of wedge plate 102 around optical axis 200 of the light incident on wedge plate 102 can change the direction of travel of the light emitted from wedge plate 102.

The light refracted by wedge plate 102 is given the declination "a" with respect to optical axis 200 of the light incident on wedge plate 102. As a result, as wedge plate 102 rotates, optical path 204 forms a cone with a vertical angle 2a around optical axis 200.

In other words, the direction of travel of the light incident on condenser lens 104 is changed depending on the rotation angle of wedge plate 102. This changes causes a change in the point on the incident surface of optical fiber 107 which the light is incident after being refracted by wedge plate 102 and being collected by condenser lens 104. Thus, when wedge plate 102 is at a different rotation angle, the light is incident on a different point on the incident surface of optical fiber 107.

Figure 4:
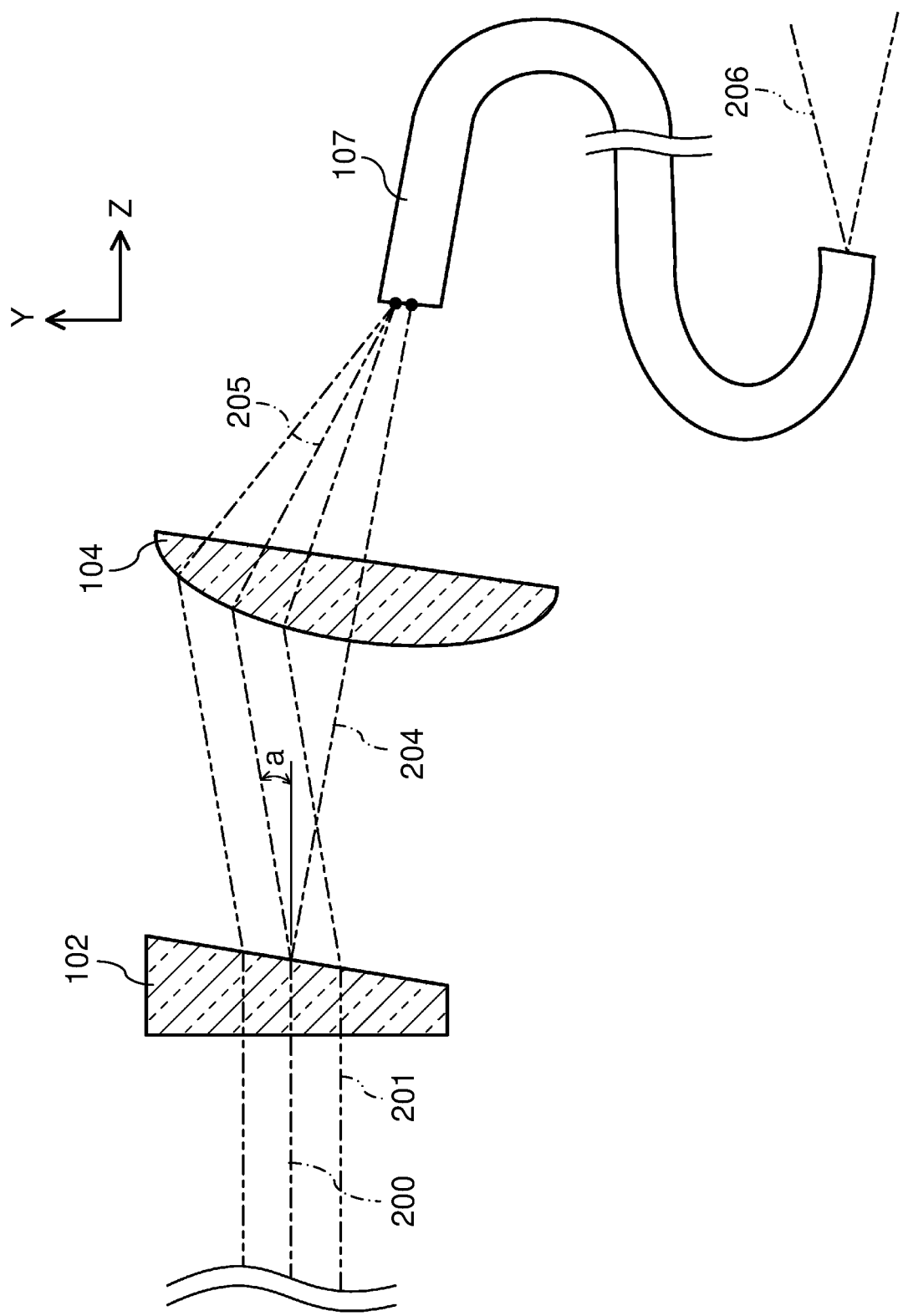
FIG. 4 is a partially cutaway side view corresponding to the view of FIG. 2 when the rotation angle of the wedge plate is changed.

FIG. 4 shows wedge plate 102 rotated 180 degrees from the reference rotation position. This position is referred to as the inverted position. The inverted position is a second rotation angle different from the first rotation angle. FIG. 4 includes optical path 205 formed when wedge plate 102 is at the inverted position. FIG. 4 also includes, for comparison, optical path 204 formed when wedge plate 102 is at the reference rotation position.

As shown in FIG. 4, when wedge plate 102 is at the reference rotation position, the light refracted by wedge plate 102 is incident on condenser lens 104 in the direction perpendicular to the center of lens 104 as shown by optical path 204. The light collected by condenser lens 104 is incident on only core 300 of optical fiber 107. In other words, when wedge plate 102 is at the first rotation angle, the light is incident on only core 300 of optical fiber 107.

Meanwhile, when wedge plate 102 is inverted from the reference rotation position, optical path 205 in the inverted position is changed. This inversion changes both the point and angle of incidence of the light refracted by wedge plate 102 with respect to condenser lens 104. To be more specific, the light refracted by wedge plate 102 is incident on condenser lens 104 at its upper part (the positive side of the Y axis). In this case, the angle of incidence to condenser lens 104 can be expressed by 90−2a [°].

As shown in FIGS. 3 and 4, when wedge plate 102 is at the inverted position, the light collected by condenser lens 104 is not incident on core 300 of optical fiber 107, but incident on first clad 301 only. Thus, when wedge plate 102 is at the second rotation angle, the light is incident on only first clad 301 of optical fiber 107. Subsequently, light 206 is emitted from optical fiber 107 in a different mode from light 202, which is emitted when wedge plate 102 is at the reference rotation position.

Figure 5:
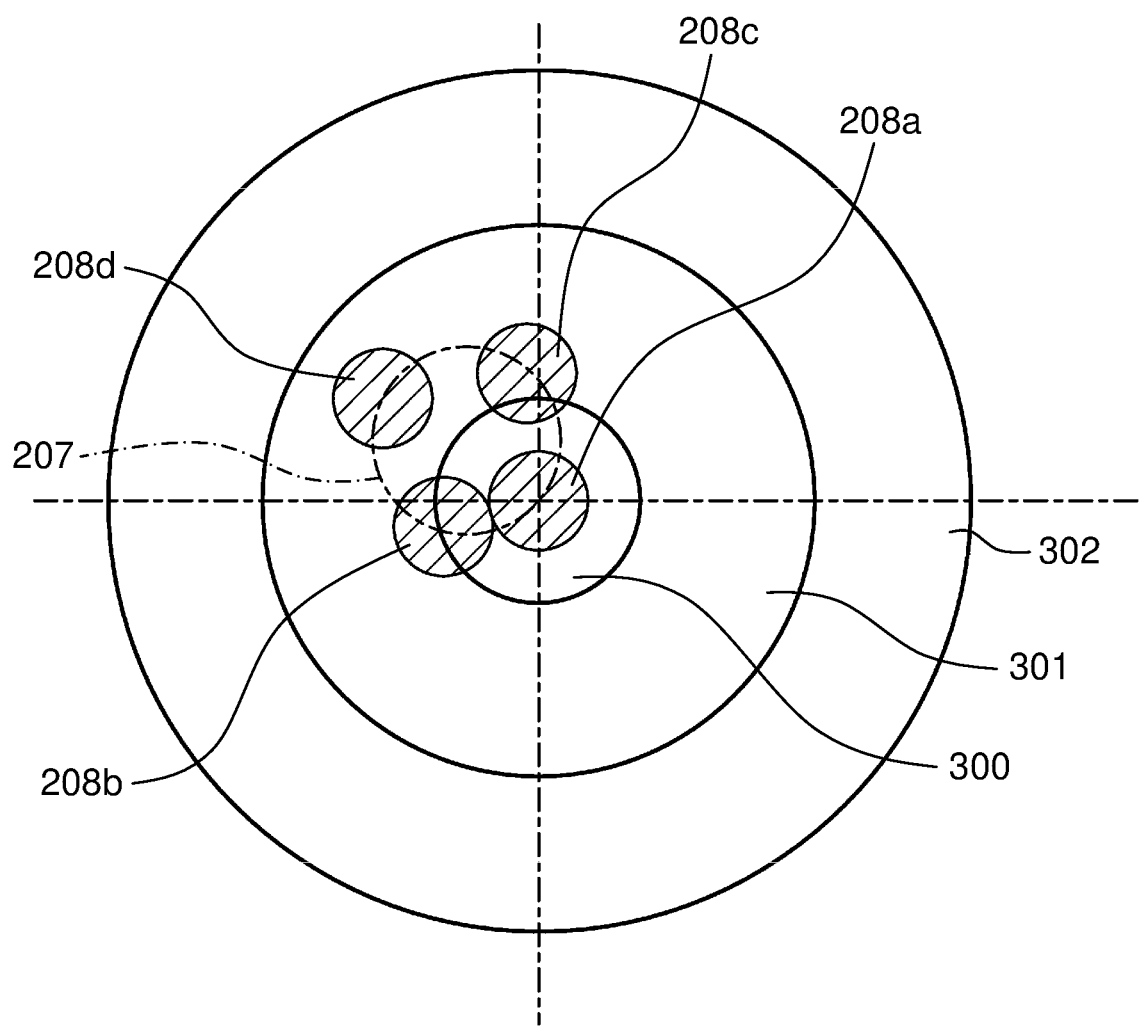
FIG. 5 is a front view of the incident surface of the optical fiber.

As shown in FIG. 5, as wedge plate 102 rotates, the focal point of the light collected by condenser lens 104 changes across the incident surface of optical fiber 107 in such a manner as to move along chain line 207. Thus, the collected light can have a focal point which changes continuously as focal points 208a, 208b, 208d and 208c in this order.

When the laser light is at focal point 208a, wedge plate 102 is at the reference rotation position or the first rotation angle, so that the laser light is collected and received by core 300 only.

At focal point 208b, the laser light is mostly collected and received by core 300, but is partly collected and received by first clad 301. In other words, at focal point 208b, the laser light straddles core 300 and first clad 301. As a result, two or more clad propagation modes exist.

When the laser light is at focal point 208d, wedge plate 102 is at the inverted position or the second rotation angle, so that the laser light is collected and received by first clad 301 only.

At focal point 208c, the laser light is mostly collected and received by first clad 301, but is partly collected and received by core 300. In other words, at focal point 208c, the laser light straddles core 300 and first clad 301. As a result, two or more clad propagation modes exist.

Assuming that the laser light has a spot diameter of 80 μm, the distance from the point 208a to the point 208d can be made greater than 140 μm. This allows choosing whether the laser light should be collected and received by either core 300 only by first clad 301 only.

Thus, wedge plate 102 can be designed to rotate in such a manner as to change the point of light collection on optical fiber 107 along chain line 207. In this case, the point and angle of incidence of the laser light with respect to optical fiber 107 can be selected continuously so that the energy of the laser light incident on core 300 and first clad 301 can be variable. In short, the ratio of the energy of the light incident on core 300 to the energy of the light incident on first clad 301 can be variable.

As a result, the energy of the incident light can be selectively distributed between core 300 and first clad 301, thereby changing the light propagation mode in optical fiber 107.

The following is a description of changes in the light propagation mode in optical fiber 107.

Figure 6:
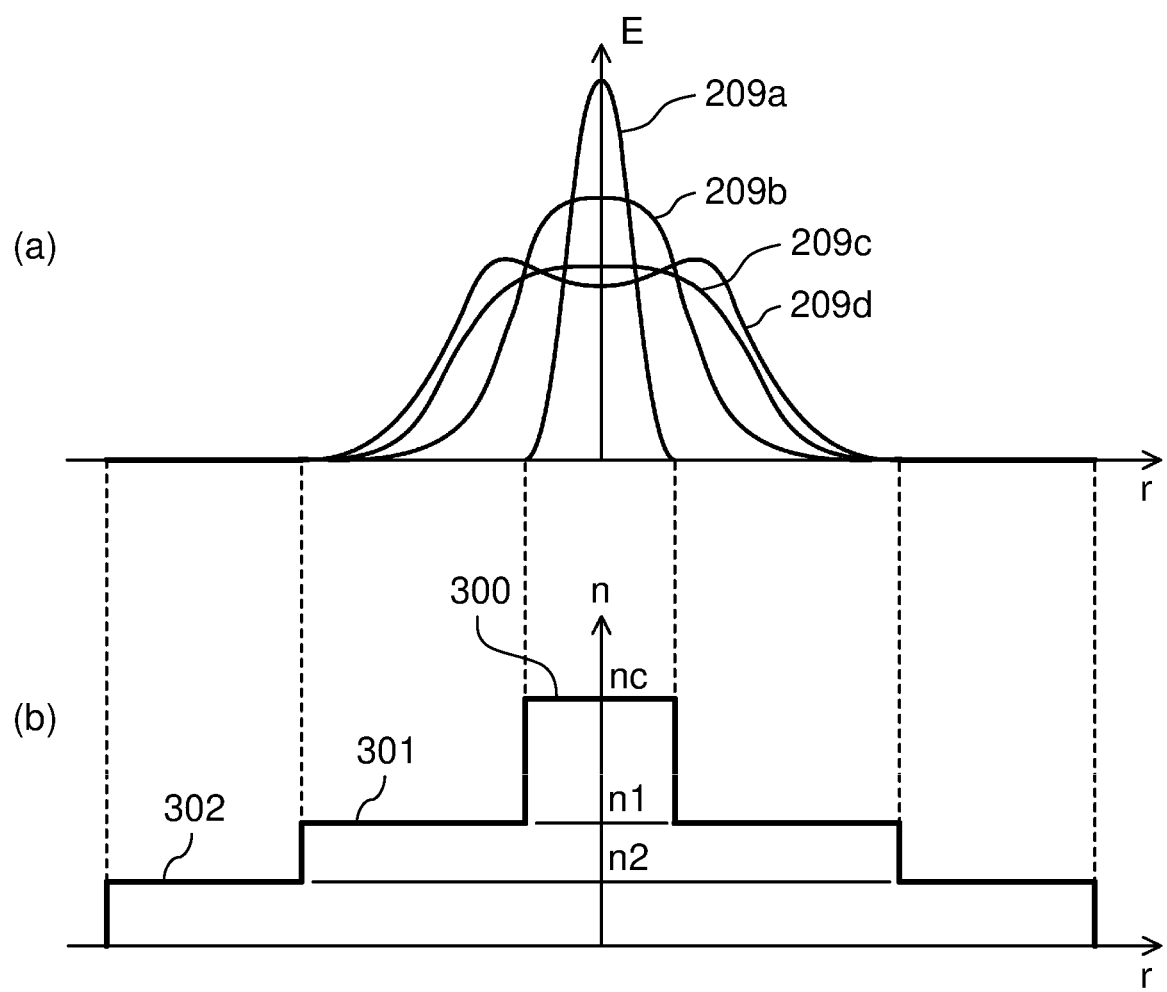
FIG. 6 shows the intensity distribution of light emitted from the optical fiber and the refractive index distribution of the optical fiber.

FIG. 6 (a) shows intensity distributions 209a, 209b, 209c and 209d of the emitted light corresponding to focal points 208a, 208b, 208c and 208d (FIG. 5), respectively. The vertical axis represents the energy E of the light emitted from optical fiber 107, whereas the horizontal axis represents the distance r from the center of core 300.

FIG. 6 (b) shows the refractive index distribution of optical fiber 107. The vertical axis represents the refractive index n of the waveguide, whereas the horizontal axis represents the distance r from the center of core 300. The broken lines represent the boundary surfaces between core 300 and first clad 301 and between first clad 301 and second clad 302 in optical fiber 107.

In the intensity distribution 209a corresponding to the focal point 208a, the NA of the emitted light is small. The NA increases in the order of 209b, 209c and 209d along with the rotation of wedge plate 102.

In the intensity distribution 209d corresponding to the focal point 208d, the energy from first clad 301 is greater than the energy from core 300. This indicates that the emitted light has a doughnut-shaped intensity distribution with low intensity at the beam center.

A comparison between the intensity distributions 209b and 209c of the emitted light corresponding to the focal points 208b and 208c, respectively, indicates as follows. As the proportion of the energy that enters core 300 of optical fiber 107 is smaller, the intensity distribution is more similar in shape to a top hat.

As described above, according to fiber coupling device 100 of the present exemplary embodiment, the light is incident on a different point on the incident surface of optical fiber 107 along with a change in the rotation angle of wedge plate 102. Therefore, adjusting the rotation angle of wedge plate 102 can change the light propagation conditions in optical fiber 107. Furthermore, the propagation conditions can be changed without stopping the output of the laser light. This enables continuously changing properties of the light emitted from optical fiber 107.

When wedge plate 102 is at the reference rotation position (the first rotation angle), the light refracted by wedge plate 102 passes through the center of condenser lens 104 and the center of the incident surface of optical fiber 107. Thus, when wedge plate 102 is at the reference rotation position, the light is incident on the center of condenser lens 104. When the rotation angle of wedge plate 102 is changed, the light is incident on a point on condenser lens 104 different from the center.

This can change the point and angle of incidence of the light onto the incident surface of optical fiber 107, thereby changing the ratio of the energy that propagates through core 300 to the energy that propagates through first clad 301 in optical fiber 107. As a result, the light propagation mode in optical fiber 107 changes, thereby continuously changing properties of the light emitted from optical fiber 107.

When wedge plate 102 is rotated, for example, to the opposite position (the second rotation angle) so that the laser light is incident on first clad 301 only, the light can have a doughnut-shaped intensity distribution with low intensity at the beam center. This enables the light emitted from optical fiber 107 to be applied to a wide range by reducing its density. Thus, laser light with low precision of positioning can be used for a large laser process surface.

Furthermore, wedge plate 102 can be rotated such that the light can straddle core 300 and first clad 301 instead of striking core 300 only or first clad 301 only on the incident surface of optical fiber 107.

Optical fiber 107 used in the present exemplary embodiment is a double-clad fiber, but it may alternatively be, for example, a PANDA fiber or a double-core fiber. Using these fibers can achieve polarization control or a special beam called a ring beam.

The laser light as the light source is multimode near-infrared collimated light in the present exemplary embodiment, but it may alternatively be laser light with different wavelengths or in a single mode. The propagation mode does not matter.

Fiber coupling device 100 of the present exemplary embodiment includes rotary drive unit 103 for rotating wedge plate 102. In the present invention, however, the rotary drive unit is not an indispensable component; wedge plate 102 can only be rotated around the optical axis of the incident light. When wedge plate 102 is at a different rotation angle, the light is incident on a different point on the incident surface of optical fiber 107. This enables changing properties of the light emitted from optical fiber 107 continuously depending on the rotation angle of wedge plate 102.

INDUSTRIAL APPLICABILITY

As described above, the present invention, which can continuously change properties of laser light emitted from an optical fiber, is useful as a fiber coupling device for making the laser light collected and received by the optical fiber.

REFERENCE MARKS IN THE DRAWINGS 100 fiber coupling device
102 wedge plate
103 rotary drive unit
104 condenser lens
107 optical fiber
200 optical axis
300 core
301 first clad
302 second clad

The invention claimed is:

1. A fiber coupling device comprising:
a wedge plate configured to receive light and to refract the light in a predetermined direction;
a condenser lens configured to collect the light refracted by the wedge plate;
a holding unit that fixes the condenser lens; and
an optical fiber having an incident surface configured to receive the light collected by the condenser lens, wherein
the wedge plate is rotatable relative to the condenser lens and the holding unit, and around an optical axis of the light incident on the wedge plate, and
the light refracted by the wedge plate and collected by the condenser lens is incident on an incident point on the incident surface, the incident point continuously changing depending on a rotation angle of the wedge plate.

2. The fiber coupling device according to claim 1, wherein the optical fiber comprises:
a core including a center of the incident surface;
a first clad outside the core; and
a second clad outside the first clad, and
the rotation angle of the wedge plate is adjustable such that the light is incident on at least one of the core and the first clad.

3. The fiber coupling device according to claim 2, wherein when the wedge plate is at a first rotation angle, the light refracted by the wedge plate passes through a center of the condenser lens and the center of the incident surface of the optical fiber.

4. The fiber coupling device according to claim 3, wherein when the wedge plate is at a second rotation angle different from the first rotation angle, the light refracted by the wedge plate and collected by the condenser lens is incident on the first clad only.

5. The fiber coupling device according to claim 1, further comprising a rotary drive unit configured to rotate the wedge plate around the optical axis of the light incident on the wedge plate.

6. The fiber coupling device according to claim 1, further comprising a receptacle that holds the optical fiber such that the wedge plate is rotatable relative to the incident surface of the optical fiber.

7. The fiber coupling device according to claim 1, wherein the wedge plate has:
an incident surface configured to receive the light; and
an emission surface that is inclined with respect to the incident surface of the wedge plate and is configured to refract the received light.

8. The fiber coupling device according to claim 7, wherein an angle between the incident surface of the wedge plate and the emission surface is not 90 degrees.

9. The fiber coupling device according to claim 7, wherein an angle between the incident surface of the wedge plate and the emission surface is 2 degrees.

10. A system comprising:
the fiber coupling device according to claim 1; and
a laser output device configured to emit collimated light to the wedge plate.

11. A system comprising:
the fiber coupling device according to claim 7; and
a laser output device configured to emit collimated light onto the incident surface of the wedge plate.

* * * * *